US009026623B2

(12) United States Patent
Wang et al.

(10) Patent No.: US 9,026,623 B2
(45) Date of Patent: May 5, 2015

(54) LAYERED ARCHITECTURES FOR REMOTE DYNAMIC ADMINISTRATION OF DISTRIBUTED CLIENT CONFIGURATIONS

(75) Inventors: Kevin Kuan Wang, Seattle, WA (US); Cameron Dee Stillion, Redmond, WA (US); Vijaysundar R. Srirangam, Redmond, WA (US); Edward Wu, Bellevue, WA (US); David Paul Harris Gorbet, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 483 days.

(21) Appl. No.: 12/024,106

(22) Filed: Jan. 31, 2008

(65) Prior Publication Data
US 2009/0198796 A1 Aug. 6, 2009

(51) Int. Cl.
G06F 15/177 (2006.01)
G06F 15/173 (2006.01)
G06Q 30/00 (2012.01)
H04L 12/24 (2006.01)
H04L 29/08 (2006.01)
H04L 29/06 (2006.01)

(52) U.S. Cl.
CPC .......... *H04L 41/0803* (2013.01); *H04L 41/082* (2013.01); *H04L 41/0856* (2013.01); *H04L 63/083* (2013.01); *H04L 67/025* (2013.01)

(58) Field of Classification Search
USPC .................................. 709/223, 224, 225, 226
See application file for complete search history.

(56) References Cited

U.S. PATENT DOCUMENTS 5,764,887 A * 6/1998 Kells et al. ..................... 726/14
6,324,578 B1 * 11/2001 Cox et al. ..................... 709/223
(Continued)

FOREIGN PATENT DOCUMENTS

JP 2003-509785 A 3/2003

OTHER PUBLICATIONS

"Instructions for Getting Started with Sun Connection's Update Manager and Sun Hosted Solutions", Copyright 1994-2008, Sun Microsystems. Inc. pp. 3.
(Continued)

*Primary Examiner* — Ninos Donabed
*Assistant Examiner* — Farrukh Hussain
(74) *Attorney, Agent, or Firm* — Henry Gabryjelski; Kate Drakos; Micky Minhas (57) ABSTRACT

This description provides tools related to layered architectures for remote dynamic administration of distributed client configurations. These tools provide methods that may include subscribing to have online configuration services remotely manage applications installed on client systems. The methods may also include receiving dynamically-updated lists from the online configuration services, with these lists including the installed applications. The methods may also receive configuration payloads that specify how to configure the installed applications, and may configure the installed applications based on these configuration payloads. The methods may also present user interfaces on the client systems, with the user interfaces including the configured applications. The tools also provide methods that may include receiving subscription information from the customer sites, with the subscription information indicating that the customer sites have subscribed to the online configuration services. The methods may also include sending the dynamically-updated lists and the configuration payloads to the customer sites.

19 Claims, 6 Drawing Sheets

(56) References Cited

U.S. PATENT DOCUMENTS

| | | | |
|---|---|---|---|
| 6,418,555 B2* | 7/2002 | Mohammed | 717/169 |
| 6,430,609 B1 | 8/2002 | Dewhurst et al. | |
| 6,996,599 B1 | 2/2006 | Anders et al. | |
| 7,080,371 B1* | 7/2006 | Arnaiz et al. | 717/170 |
| 7,155,681 B2 | 12/2006 | Mansour et al. | |
| 7,206,827 B2 | 4/2007 | Viswanath et al. | |
| 7,246,360 B2 | 7/2007 | De Bonet | |
| 7,263,551 B2 | 8/2007 | Belfiore et al. | |
| 2003/0220989 A1 | 11/2003 | Tsuji et al. | |
| 2004/0148347 A1* | 7/2004 | Appelman et al. | 709/204 |
| 2004/0148375 A1 | 7/2004 | Levett et al. | |
| 2004/0148379 A1* | 7/2004 | Ogura | 709/223 |
| 2006/0090080 A1 | 4/2006 | Pearson et al. | |
| 2007/0200914 A1* | 8/2007 | DuMas et al. | 348/14.01 |
| 2008/0130639 A1* | 6/2008 | Costa-Requena et al. | 370/389 |

OTHER PUBLICATIONS

"Microsoft Smart Client Application Promotion", 2008, Microsoft Corporation, pp. 4.

Albrecht, et al., "Remote Control: Distributed Application Configuration, Management, and Visualization with Plush", Proceedings of the 21st Large Installation System Administration Conference (LISA '07), pp. 1-16.

Martel, et al., "Remote Management of Distributed Applications", Proceedings of the 12th Euromicro Conference on Parallel, Distributed and Network-Based Processing, (EUROMICRO-PDP'04), 2004, IEEE, pp. 8.

Smith, "Talking Shop: Using Citrix NFuse to Web-enable applications", 2008, CNET Networks, Inc. pp. 5.

International Search Report dated Aug. 3, 2009 in International Application No. PCT/US2008/088641.

"Instructions for Getting Started with Sun Connection's Update Manager and Sun Hosted Solutions", downloaded Jan. 16, 2008 from http://www.sun.com/service/sunconnection/gettingstarted.jsp, Sun Microsystems. Inc. 3 pages.

Albrecht, et al., "Remote Control: Distributed Application Configuration, Management, and Visualization with Plush", 2007, Proceedings of the 21st Large Installation System Administration Conference (LISA '07), pp. 1-16.

* cited by examiner

LAYERED ARCHITECTURES FOR REMOTE DYNAMIC ADMINISTRATION OF DISTRIBUTED CLIENT CONFIGURATIONS

BACKGROUND

Corporate enterprises typically devote considerable resources to acquiring and maintaining their computing infrastructure. These resources may include financial expenditures and commitments to purchase or lease the infrastructure, and may also include ongoing labor costs to maintain the infrastructure after acquisition. In an effort to reduce or control the expenditure of these resources, some enterprises are turning to hosted solutions, in which third parties may host at least part of the enterprise infrastructure.

SUMMARY

This description provides tools related to layered architectures for remote dynamic administration of distributed client configurations. These tools provide methods that may include subscribing to have online configuration services remotely manage applications installed on client systems. The methods may also include receiving dynamically-updated lists from the online configuration services, with these lists including the installed applications. The methods may also receive configuration payloads that specify how to configure the installed applications, and may configure the installed applications based on these configuration payloads. The methods may also present user interfaces on the client systems, with the user interfaces including the configured applications. The tools also provide methods that may include receiving subscription information from the customer sites, with the subscription information indicating that the customer sites have subscribed to the online configuration services. The methods may also include sending the dynamically-updated lists and the configuration payloads to the customer sites.

The above-described subject matter may also be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies that provide layered architectures for remote dynamic administration of distributed client configurations. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of tools and techniques for multi-client collaboration to access and update structured data elements will be described.

Figure 1:
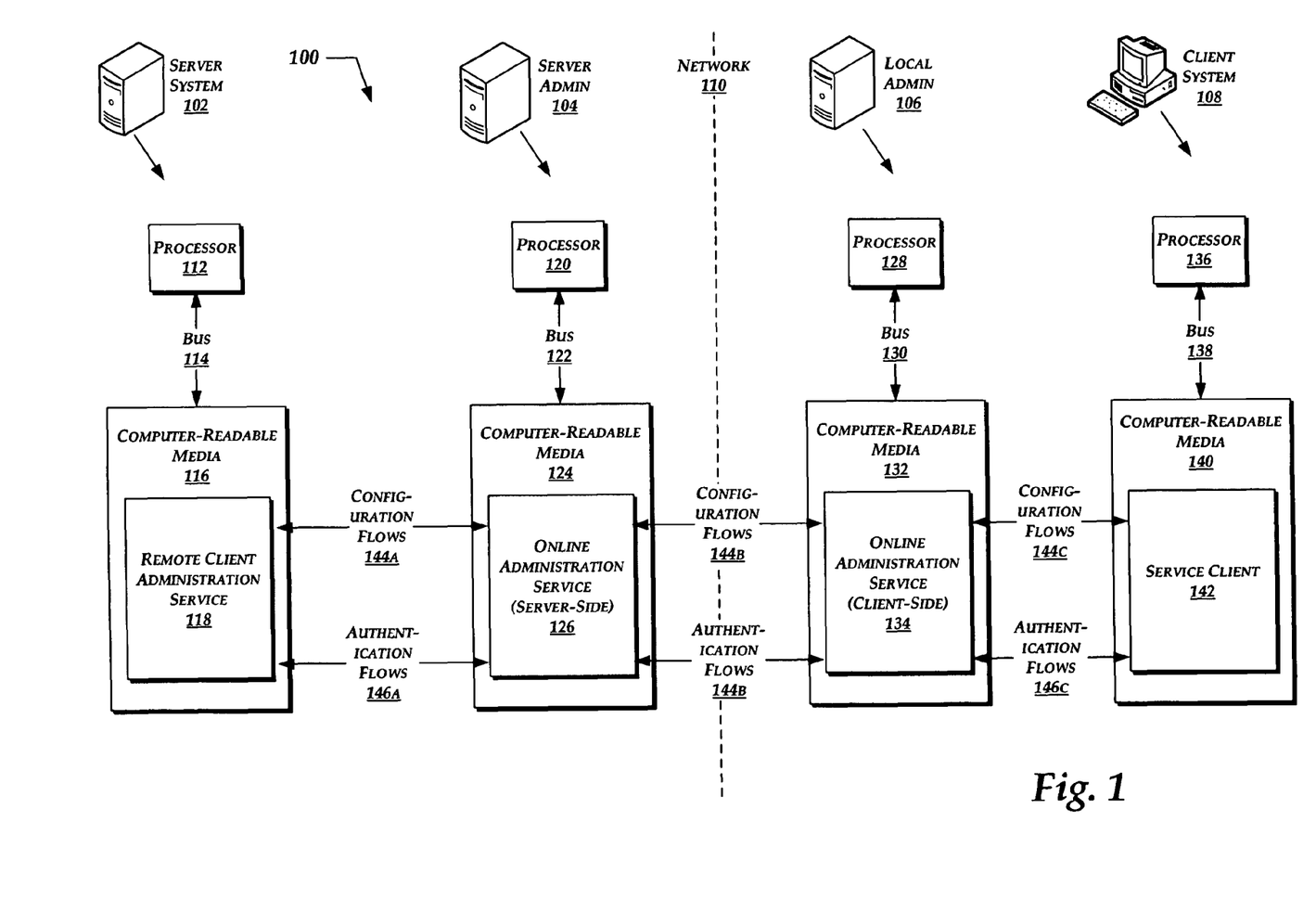
FIG. 1 is a combined block and data flow diagram illustrating systems or operating environments for layered architectures for remote dynamic administration of distributed client configurations.

FIG. 1 illustrates systems or operating environments, denoted generally at 100, for layered architectures for remote dynamic administration of distributed client configurations. These systems 100 may provide a layered architecture that includes one or more server systems 102, one or more server administrative systems 104, one or more local or client-side administrative systems 106, and one or more client systems or end-user system 108. The layered architecture shown in FIG. 1 may be described as a client-server architecture, including server-side systems 102 and 104 and client-side systems 106 and 108. The server-side systems and the client-side systems may communicate over a network 110, which may represent local, regional, or global communications networks. One example of the network 110 is the Internet.

For clarity of description only, FIG. 1 provides one example of the server system 102, the server administrative system 104, the local administrative system 106, and the client system 108. However, implementations of the description herein may include any number of servers or systems. The graphical elements used in FIG. 1 to depict the server systems are chosen only to facilitate illustration, and not to limit possible implementations of the description herein.

As detailed further in the description below, the various systems and servers shown in FIG. 1 may facilitate tools and techniques for enabling the systems 102, 104, and/or 106 remotely to manage configurations of the client systems 108.

In this manner, these systems 102, 104, and/or 106 may relieve administrative personnel associated with the client systems 108 of these tasks.

Turning to the server system 102 in more detail, the system may include one or more processors 112, which may have a particular type or architecture, chosen as appropriate for particular implementations. The processors 112 may couple to one or more bus systems 114 chosen for compatibility with the processors 112.

The servers 102 may also include one or more instances of computer-readable storage media 116, which couple to the bus systems 114. The bus systems may enable the processors 112 to read code and/or data to/from the computer-readable storage media 116. The media 116 may represent storage elements implemented using any suitable technology, including but not limited to semiconductors, magnetic materials, optics, or the like. The media 116 may include memory components, whether classified as RAM, ROM, flash, or other types, and may also represent hard disk drives.

The storage media 116 may include one or more modules of instructions that, when loaded into the processor 112 and executed, cause the server 102 to perform various techniques relating to layered architectures for remote dynamic administration of distributed client configurations. FIG. 1 shows an example in which the media 116 includes a remote client administration service 118, which generally represents software instructions that enable the server system 102 to perform the functions allocated to it in the description herein.

Turning to the server administrative system 104 in more detail, the system may include one or more processors 120, which may have a particular type or architecture, chosen as appropriate for particular implementations. The processors 120 may couple to one or more bus systems 122 chosen for compatibility with the processors 120.

The servers 104 may also include one or more instances of computer-readable storage media 124, which couple to the bus systems 122. The bus systems may enable the processors 120 to read code and/or data to/from the computer-readable storage media 124. The media 124 may represent storage elements implemented using any suitable technology, including but not limited to semiconductors, magnetic materials, optics, or the like. The media 124 may include memory components, whether classified as RAM, ROM, flash, or other types, and may also represent hard disk drives.

The storage media 124 may include one or more modules of instructions that, when loaded into the processor when 20 and executed, cause the administrative server 104 to perform various techniques relating to layered architectures for remote dynamic administration of distributed client configurations. FIG. 1 shows an example in which the media 124 includes a server-side online administration service 126, which generally represents software instructions that enable the administrative server system 104 to perform the functions allocated to it in the description herein.

Turning to the local administrative system 106 in more detail, this system may include one or more processors 128, which may have a particular type or architecture, chosen as appropriate for particular implementations. The processors 128 may couple to one or more bus systems 130 chosen for compatibility with the processors 128.

The local administrative system 106 may also include one or more instances of computer-readable storage media 132, which couple to the bus systems 130. The bus systems may enable the processors 128 to read code and/or data to/from the computer-readable storage media 132. The media 132 may represent storage elements implemented using any suitable technology, including but not limited to semiconductors, magnetic materials, optics, or the like. The media 132 may include memory components, whether classified as RAM, ROM, flash, or other types, and may also represent hard disk drives.

The storage media 132 may include one or more modules of instructions that, when loaded into the processor 128 and executed, cause the local administrative system 106 to perform various techniques relating to layered architectures for remote dynamic administration of distributed client configurations. FIG. 1 shows an example in which the media 132 includes a client-side online administrative service 134, which generally represents software instructions that enable the local administrative system 106 to perform the functions allocated to it in the description herein.

Turning to the client system 108 in more detail, this system may include one or more processors 136, which may have a particular type or architecture, chosen as appropriate for particular implementations. The processors 136 may couple to one or more bus systems 138 chosen for compatibility with the processors 136.

The client systems 108 may also include one or more instances of computer-readable storage media 140, which couple to the bus systems 138. The bus systems may enable the processors 136 to read code and/or data to/from the computer-readable storage media 140. The media 140 may represent storage elements implemented using any suitable technology, including but not limited to semiconductors, magnetic materials, optics, or the like. The media 140 may include memory components, whether classified as RAM, ROM, flash, or other types, and may also represent hard disk drives.

The storage media 140 may include one or more modules of instructions that, when loaded into the processor 136 and executed, cause the client systems 108 to perform various techniques relating to layered architectures for remote dynamic administration of distributed client configurations. FIG. 1 shows an example in which the media 140 includes a service client 142, which generally represents software instructions that enable the client systems 108 to perform the functions allocated to it in the description herein.

In providing the above examples of the processors 112, 120, 128, and 136, it is noted that these processors may or may not have the same type or architecture. Instead, it is possible for the systems 102, 104, 106, and 108 to include processors having different types or architectures, as appropriate in different implementation environments.

Having described the systems 102, 104, 106, and 108, the description of FIG. 1 now proceeds with an overview of data and/or process flows related to layered architectures for remote dynamic administration of distributed client configurations. Generally, these systems 102, 104, 106, and/or 108 may cooperate in a layered architecture to perform configuration flows (collectively, 144), and which these systems 102, 104, and/or 106 cooperate to configure and maintain the client systems 108 using the service client 142. FIG. 1 denotes examples of these configuration flows at 144a, passing between the remote client administration service 118 and the server-side administration service 126. Configuration flows 144b may pass between the server-side administration service 126 and the client-side administration service 134. Finally, configuration flows 144c may pass between the client-side administration service 134 and the service client 142.

In addition to the configuration flows 144, the systems 102, 104, 106, and/or 108 may also exchange data/process flows related to authenticating the client systems 108. FIG. 1 denotes these flows generally at 146, with specific examples of the authentication flows 146a passing between the remote client administration service 118 and a server-sided administration service 126. In addition, authentication flows 146b may pass between the server-side administration service 126 and the client-side administration service 134, and authentication flows 146c may pass between the client-side administration service 134 and the service client 142.

Having described the systems or operating environments relating to layered architectures for remote dynamic administration of distributed client configurations in FIG. 1, the discussion now proceeds to a description of components and data flows related to configuring the client systems. This discussion is now presented with FIG. 2.

Figure 2:
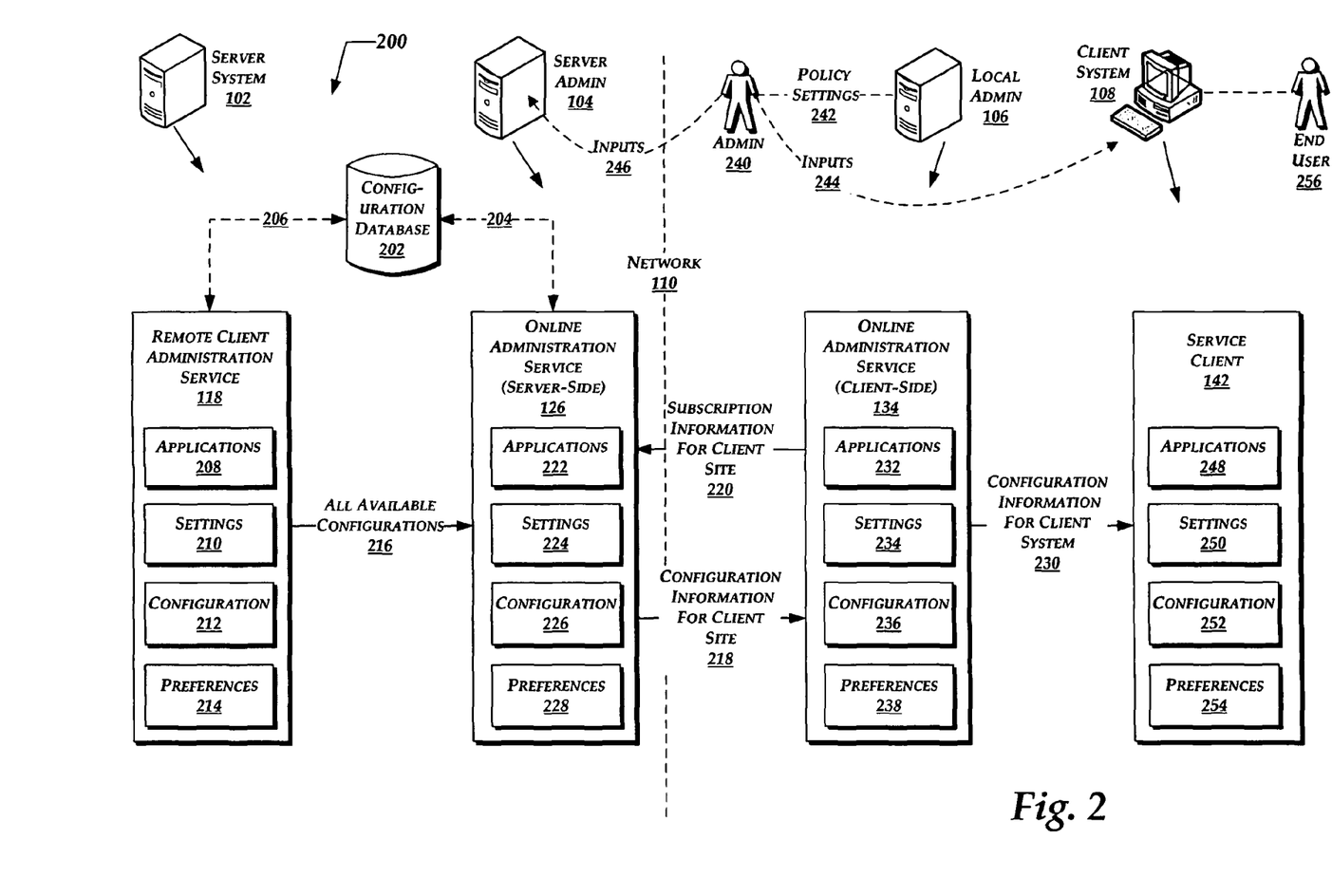
FIG. 2 is a combined block and data flow diagram illustrating a layered or filtered architecture related to remotely configuring and maintaining client systems.

FIG. 2 illustrates a layered or filtered architecture, denoted generally at 200, related to remotely configuring and maintaining client systems. For ease of reference, and not limitation, FIG. 2 may carry forward some reference numbers from previous drawings to refer to similar items. For example, FIG. 2 carries forward the server system 102, the server administration system 104, the local administration system 106, and the client system 108. In addition, FIG. 2 carries forward the remote client administration service 118, the server-side administration service 1.6, the client-side administration service 134, and the service client 142.

Turning to FIG. 2 in more detail, the server system 102 and server administrative system 104 may communicate with one or more configuration databases 202, as represented by the dashed lines 204 and 206. The remote client administration service 118 may read from the configuration database a global list of all available applications 208 that are available for installation on various client systems 108. The administration service 118 may also read a set of globally-available settings 210 from the configuration database, and associate these settings with corresponding applications. The service 118 may also obtain from the database 202 a global set of configuration parameters 212, and a global set of preferences 214.

The administration service 208 may then forward the application information, these settings information 210, the configuration information 212, and/or the preferences information 214 to the server-side administration service 126. FIG. 2 denotes these configuration flows at 216, which are understood to elaborate further on the configuration flows 144a shown in FIG. 1. In this manner, the administration service 118 may notify the server-side service 126 of all applications, settings, configuration parameters, and/or preferences available for installation on any given client system 108 within a particular operating environment.

Turning to these server-side administration service 126 in more detail, it may receive the available configuration information 216. The administration service 126 may filter the configuration information 216 for a particular client site, resulting in the configuration information 218. For example, a particular client site may include a customer installation that further includes at least an administration server (e.g., 106), and/or a client system (e.g., 108). To perform this function, the server-side administration service 126 may obtain any subscription information available for the particular customer or client site, denoted at 220. In some cases, this subscription information 220 may indicate which applications 222 are available for installation on any client systems (e.g., 108) located within the customer site. The subscription information may also indicate settings 244, configurations 226, and/or preferences 228 available within the customer site.

In other cases, the server-side administration service 126 may read configuration information from the configuration database that is applicable to a particular customer site, as represented in the data flows 204. This configuration information may also indicate the applications 222, the settings 224, the configuration parameters 226, and/or the preferences 228 applicable at the customer site. In any scenario, the server side administration service 126 may function generally to filter the globally available configuration information 216 as appropriate across a particular customer site, resulting in the filter configuration information 218. In turn, the server-side administration service 126 may pass the filter configuration information to 18 to a client-side administration service (e.g., 134).

Turning to the client-side administration service 134 in more detail, it may further filter the configuration information 218 for particular client systems (e.g., 108) within a given customer installation, resulting in configuration information 230 applicable to a particular client system. In the examples described herein, the configuration information 218 may apply across the entire customer installation, while the configuration information 230 may apply to particular client systems within this customer installation. Accordingly, the client-side administration service 134 may specify, through the configuration information 230, particular applications 232 to be configured and maintained on a particular client system. The configuration information 230 may also specify any settings 234, configuration parameters 236, or preferences information 238 applicable to the particular client system. In some instances, the client-side administration service may interact with administrative personnel, denoted generally in FIG. 2 at 240, to establish or modify the configuration information 230.

Turning to the administrative personnel 240 in more detail, the local admin system 106 may define policy settings 242, under which the admin personnel 240 may provide inputs 244 to the client system 108, and inputs 246 to the server admin system 104. Examples of these inputs may include settings by which companies specify that users may not automatically login without typing a password. Administrators associated with these companies may enable or disable these features by sending group policies from local admin machines to the local end-user machines.

Turning to an example of a particular client system (e.g., 108), a service client (e.g., 142) installed thereon may receive the configuration information 230, and configure one or more applications 248 installed at the client system according to local settings 250, local configuration parameters 252, and/or local preferences 254. Any of the items 250, 252, and 254 may be specified in the configuration information 230. In addition, the service client 142 may aggregate settings passed down from the services 118, 126, and/or 134. The service client 142 may also apply any locally-specified settings, configuration parameters, or preferences, resulting in a further filtering of the configuration information 230.

In the foregoing manner, the tools and techniques described herein may establish and operate the layered or filtered architecture 200 as shown in FIG. 2. This layered architecture may include the administration service 118, the server-side ministration service 126, the client-side administration service 134, and the service client 142. As described above, the server-side service 126, the client-side service 134, and the service client 142 may progressively filter the globally-applicable configuration information, provided by the administration service 118, for a particular client system 108. In this manner, these services 126, 134, and the service client 142 may determine what applications 248, settings 250, configuration information 252, and/or preferences 254 may be exposed to end users associated with the client system. FIG. 2 denotes an example end user at 256.

In some implementations, the client-side administration service 134 and/or the service client 142 may communicate health monitoring or status information related to the client system 108. For example, the ministration service and/or the service client may communicate this information back to the server system 102 and/or the server admin system 104.

Having described the layered or filtered architecture 200 in FIG. 2, the discussion now proceeds to a description of authentication techniques for particular client systems. This description is now presented with FIG. 3.

Figure 3:
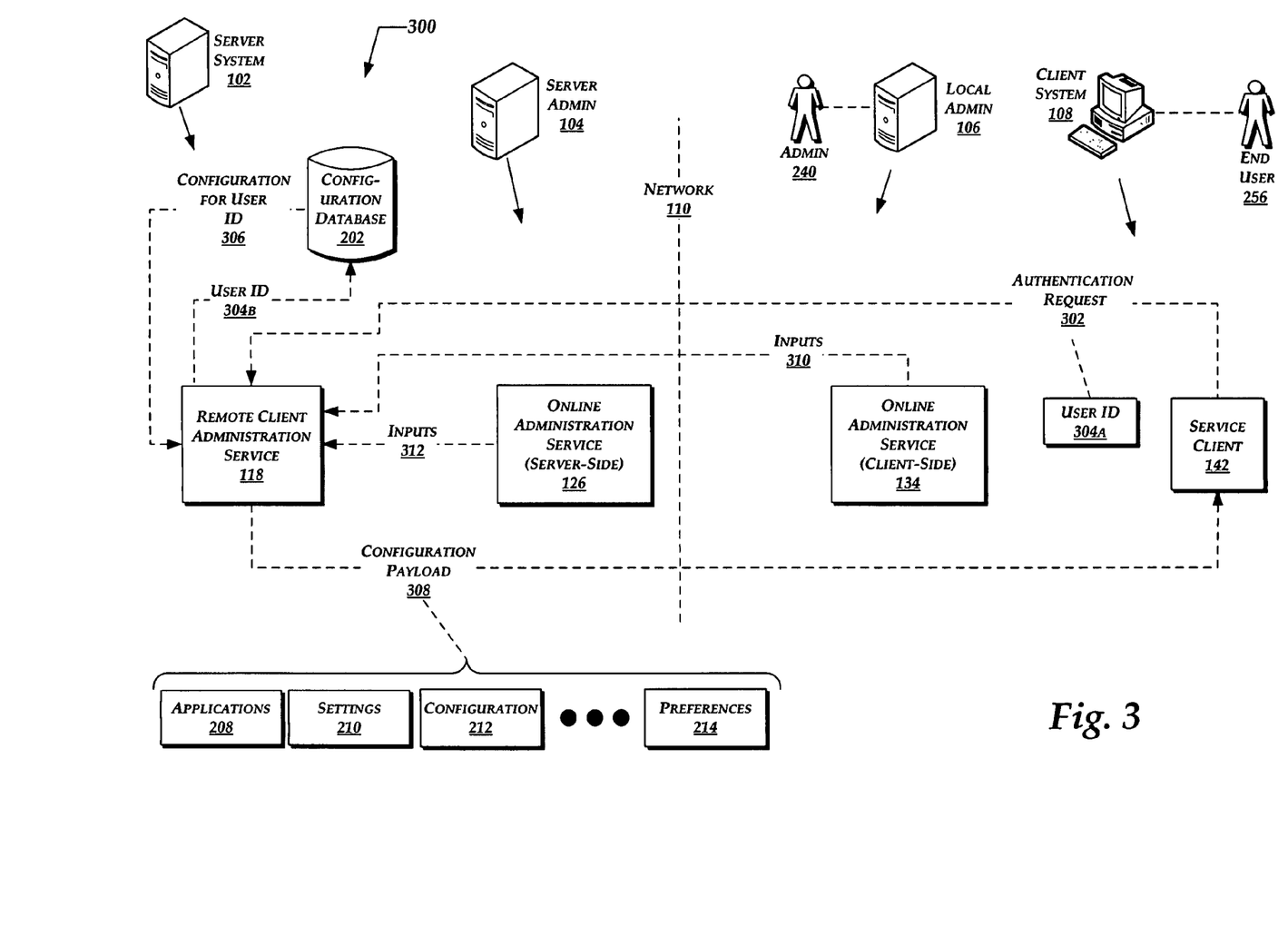
FIG. 3 is a diagram illustrating components, processes, and data flows for authenticating client systems and/or end users within the systems described herein.

FIG. 3 illustrates components, processes, and data flows, denoted generally at 300, for authenticating client systems and/or end users within the systems described herein. For ease of reference, and not limitation, FIG. 3 may carry forward some reference numbers from previous drawings to refer to similar items. For example, FIG. 3 carries forward the server system 102, the server administration system 104, the local administration system 106, and the client system 108. In addition, FIG. 3 carries forward configuration database 202, the network 110, the admin personnel 240, and the end-user 256. FIG. 3 also carries forward the remote client administration service 118, the server-side administration service 126 the client-side administration service 134, and the service client 142.

When a given end user (e.g., 256) wishes to access a client system (e.g., 108), the end-user may interact with a service client (e.g., 142) running on the client system. The service client may obtain authentication information 302 (e.g., a username/password combination) from the end-user, and send it to the remote client administration service 118. The authentication request 302 may include at least a user ID 304a, which may represent at least a username or other unique identifier associated with the end-user or an account associated with the end-user, for example.

The administration service 118 may query the configuration database 202 with the user ID for the particular end-user and client system 108, as denoted at 304b. As shown in FIG. 3, assuming that the end-user 256 exists in the system, the configuration database may return configuration information and/or subscription status for that user, as denoted at 306. In turn, the administration service 118 may create a configuration payload 308 for the particular client system 108 and end-user 256. This configuration payload may be implemented using, for example, appropriate XML or XSL files. The configuration payload may indicate, for a particular end-user 256 and/or client system 108, the particular applications 208 at the client system 108 may expose to the end-user 256. The configuration payload 308 may also specify particular settings 210 to be applied to the applications 208, as well as any applicable configuration parameters 212 and preferences 214. This process may be repeated when a given end-user logs in. In this manner, if some aspect of a particular end-user account changes, these changes will be reflected automatically the next time the end-user logs in. For example, if a new service or application is added for a particular end-user, that service or application will be made available to the end-user the next time the end-user logs in.

The configuration payloads 308 as described herein may define a series of categories of supported applications (e.g., e-mail, collaboration, calendaring, communication, or the like). These different categories may contain one or more applications. For example, within the e-mail category, one e-mail application may be a full-featured, relatively "rich" application, while a web-accessible version of the same e-mail application may be relatively "lean". The configuration payload for a particular machine may indicate how to configure these different clients in different scenarios on different machines.

The remote client administration service 118 may enable the server-side administration service 126 and/or the client-side ministration service 134 to configure what is included in the configuration payload 308. The client-side administration service 134 and the server-side administration service 126 may provide inputs, denoted protectively at 310 and 312, to the client administration service 118, which may process these inputs to configure the payload 308.

The service client 142 may apply any settings 210, configuration parameters 212, and/or preferences 214 locally on the client system 108, and may then create and render a user interface (UI or GUI) for presentation to the end-user 250. As described in further detail elsewhere herein, this UI is referred to as a "dashboard" that exposes applications 208 to the end-user, with these applications configured as specified in the payloads 308 (referring collectively to the individual payloads 308a, 308b, and 308c). The dashboard UI may receive user input selecting one or more of the exposed applications for execution, and may respond to this user input to launch the selected applications.

Once a given end user has authenticated via a given client system as described herein, that end-user may access any applications presented on the dashboard UI without further authentication. In this manner, the end-user may utilize a single logon to access any of the services or applications presented on the dashboard UI.

Having described as the components, processes, and data flows related to authenticating end users in FIG. 3, the discussion now proceeds to a description of process flows for authenticating end users and configuring client systems. This discussion is now presented with FIG. 4.

Figure 4:
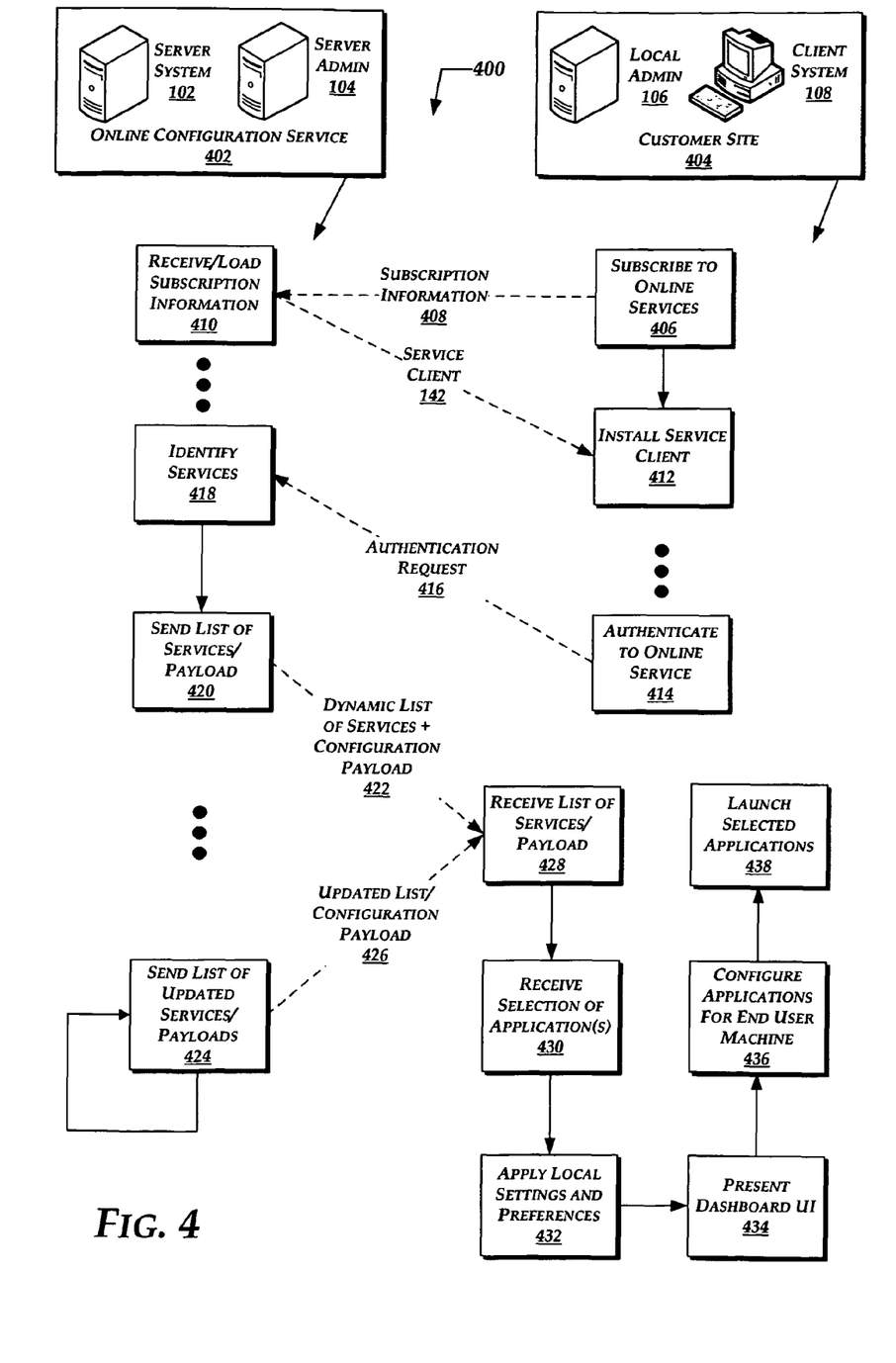
FIG. 4 is a flow diagram illustrating processes for authenticating end users and configuring client systems.

FIG. 4 illustrates process flows, denoted generally at 400, for authenticating end users and configuring client systems. For ease of reference, and not limitation, FIG. 4 may carry forward some reference numbers from previous drawings to refer to similar items. For example only, FIG. 4 arranges certain processing blocks in columns to correspond with processing performed respectively by components associated with an online configuration service 402 and by components associated with a customer site or installation 404. The online configuration service 402 may include the server system 102 and the server administration system 104. The customer site components 404 may include the local admin server 106 and the client system 108.

Turning to the process flows 400 more detail, block 406 at the customer site represents subscribing to the remote online services 402 for configuring or managing client systems, as described herein. For example, a particular customer site 404 may pay a fee to access the online configuration service 402, and may provide particular settings, configuration parameters, and/or preferences related to configuring or managing the client systems. FIG. 4 generally represents subscription information at 408.

At the online configuration service 402, block 410 represents receiving and loading the subscription information 408. For example, block 410 may include loading the subscription information into a configuration database (e.g., 202), which may be accessed later when particular end users attempt to authenticate the online service 402 through the client system 108. As described in FIG. 3 above, the online configuration services may populate configuration payloads (e.g., 308) based on the configuration database 202.

Block 410 may include sending an instance of the service client (e.g., 142) for installation at the customer site 404. At the customer site, block 412 generally represents installing respective instances of a service client (e.g., 142) on client systems (e.g., 108). Once the service client 142 is installed on a given client system, the tools and techniques described herein may then configure and manage the client system.

Once the customer site has subscribed to online services, and the online configuration service has received and loaded appropriately any subscription and configuration information pertinent to the customer site, block 414 at the customer site generally represents a given end-user requesting to authenticate to the online service. Block 414 may include receiving a login request from the end-user, with this login request including a user ID (e.g., a username-password combination). An authentication request 416 may incorporate the user ID, and block 414 may include sending the authentication request to the online configuration service.

At the online configuration service, block 418 may represent identifying particular services to which the customer site has subscribed on behalf of the client system 108. Block 418 may also include validating the user ID or other authentication information provided as part of the authentication request 416.

Block 420 generally represents sending a list of services to which the particular customer site has subscribed for the client system 108. Block 420 may also include creating a configuration payload associated with the list of services, and sending this payload to the requesting customer site 404. FIG. 4 denotes this list of services and related configuration payload at 422.

The list 422 of services and configuration payload may be dynamic, in the sense that subscription and/or configuration information for a particular customer site may change over time. For example, a particular customer site may subscribe to additional services, or may unsubscribe from some services. In addition, services (or applications made available through the services) may be updated, resulting in configuration changes rippling downstream to customers that subscribe to these services. In other instances, compatibility issues may arise between different services or applications installed on a particular client system. The service client as described herein (e.g., 142) may detect these incompatibilities, and determine how to apply the configuration payloads to resolve any incompatibilities connected within the particular client system.

Block 424 generally represents the online configuration service sending a list of updated services to one or more customer sites, along with updated configuration payloads. The process flows 400 may perform block 424 repetitively, as indicated by the arrow looping back onto block 424. FIG. 4 provides an example of an updated list and related configuration payload at 426.

In some instances, problems may arise with particular applications or services involving such applications. In such cases, the online configuration service may detect these problems, and temporarily disable such applications or services on any subscribing client systems until the problems are resolved. The configuration service may so act through the configuration payloads.

In other examples, a back-end server may become inoperative or inaccessible, or may be replaced in favor of another server. In such cases, the online configuration service may update any client systems who subscribe to services offered by such servers, through the configuration payloads. For example, such configuration payloads may include an updated URL for the back-end server. In this manner, the online configuration services may shield the client systems from back-end details relating to particular services.

At the customer site, block 428 generally represents receiving the dynamic list of services, along with the applicable configuration payload (e.g., 308) for a particular client system 108. In turn, block 430 generally represents receiving a selection of applications to be exposed to end-users on the particular client system. In some cases, the configuration payload 308 may include a plurality of different applications available for configuration on the client system 108. However, the service client installed on the client system may reconcile these applications with utilities and applications already installed on the client system. Thus, the service client may resolve any incompatibilities, where possible. In cases where the service client and are resolved some incompatibility with a given application, the service client may not expose that application on the client system.

Block 432 generally represents applying any local settings and preferences specific to the client system, and block 434 generally represents preparing and presenting the dashboard UI to an end user associated with the client system. This dashboard UI may expose one or more available applications to the end-user. Block 436 generally represents configuring these applications for the particular end user machine. Block 438 generally represents receiving input from the end-user selecting one or more of these exposed applications for execution, and may include launching the selected applications on the client system 108.

It is noted that FIG. 4 illustrates one iteration of the process flows 400 only for clarity of illustration and ease of description. However, implementations of the tools and techniques described herein may repeat at least part of the process flows 400 any number of times for any number of particular customer sites or online configuration services.

Having described the process flows 400 for authenticating particular client systems, and providing dynamic lists of services and configuration payloads to those systems, the now turns description of relationships between customer sites and particular client systems. This discussion is now presented with FIG. 5.

Figure 5:
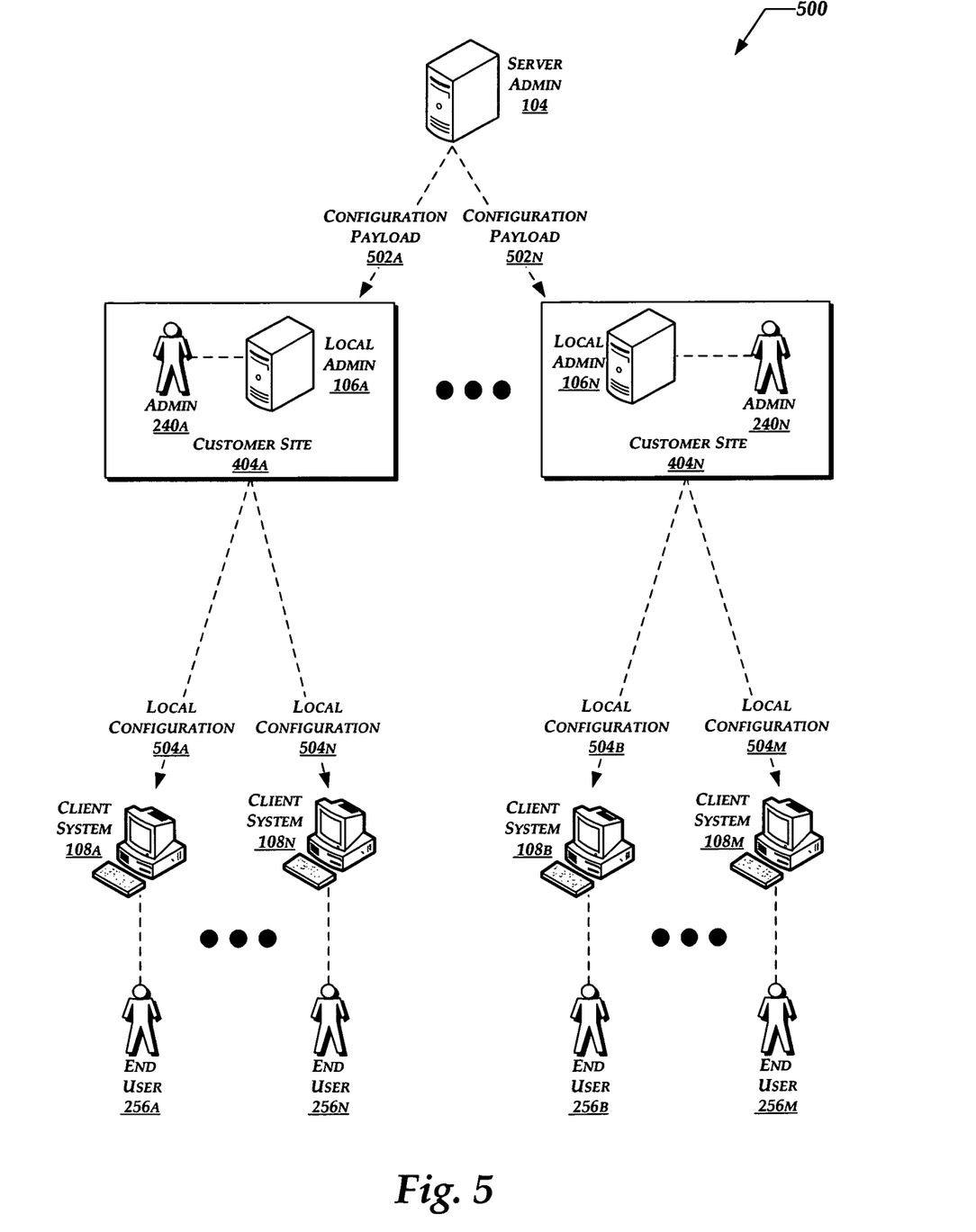
FIG. 5 is a hierarchical diagram illustrating scenarios in which a given server administration system may manage a plurality of different customer sites, with the different customer sites supporting a variety of client systems and end-users.

FIG. 5 illustrates scenarios, denoted generally at 500, in which a given server administration system may manage a plurality of different customer sites, with the different customer sites supporting a variety of client systems and end-users. For ease of reference, and not limitation, FIG. 5 may carry forward some reference numbers from previous drawings to refer to similar items.

In the examples shown in FIG. 5, a server admin system (e.g., 104) may configure and manage client systems in a plurality of different customer sites. FIG. 5 provides two examples of customer sites, denoted at 404a and 404n, which are carried forward from FIG. 4. The customer site 404a may include one or more local admin servers (e.g., carried forward at 106a) and related admin personnel (e.g., carried forward at 240a), while the customer site 404n may include one or more local admin servers (e.g., carried forward at 106n) and related admin personnel (e.g., carried forward at 240n). The server admin system 104 may manage machines at these customer sites using, for example, suitable configuration payloads 502a and 502n, which generally represent instances of the configuration payload denoted in FIG. 3 at 308b.

Turning to the customer sites 404 in more detail, the local admin server 106a at the customer site 404a may manage any number of client systems at this customer site. FIG. 5 shows two examples of such client systems, denoted at 108a and 108n. The local admin server 106a may receive the configuration payloads 502a, and the service clients running on the client systems may reconcile these configuration payloads as appropriate for the particular characteristics and capabilities of the client systems 108a and 108n.

In turn, the various client systems 108a, 108n, 108b, and 108m may be associated with respective local configurations, denoted at 504*a*, 504*n*, 504*b*, and 504*m*. These local configurations may be determined by the configuration payloads 502, as well as local administrators managing the client systems, particular end user settings on the client systems, and the particular service clients installed on the client systems.

FIG. 5 carries forward two examples of end-users, denoted at 256*a* and 256*n*. In an example scenario, the two end-users 256*a* and 256*n* may correspond to the same person or user. In this scenario, the end-user 256*a* may represent this person accessing e-mail at work from a desktop system, denoted at 108*a*, and the end-user 256*n* may represent the same person accessing e-mail from a home system 108*n*. In this example, the service client may determine that the client system 108*a* is loaded with a full-featured e-mail application, and may create a dashboard UI by which the end user may access this full-featured e-mail application from work.

Continuing the previous example, when the same user logs in from home using the client system 108*n*, the service client running on this client system 108*n* may detect that this client system does not support the full-featured e-mail application, or that the full-featured e-mail application has not been installed on this client system. Accordingly, the service client may create or update a local configuration 504*n* to the client system 108*n*. In this example, the local configuration 504*n* may enable the user to access e-mail via a web-based service, rather than the full-featured e-mail application. In this example, the second client system 108*n* may cooperate with the online management service by installing an instance of the service client (e.g., 142).

Other example scenarios are now discussed, directing attention to the customer site 404*n*. This customer site may include two or more client systems, denoted at 108*b* and 108*m*, with these client systems associated respectively with end-users 250*b* and 250*m*. In this example, assume that the client system 108*b* and the end-user 250*b* belong to a first organization within the customer site, and assume that the client system 108*m* and the end-user 250*m* belong to a different organization within the customer site. Assume further that these end-users within these different organizations access to different applications, or may access similar applications subject to different settings, configurations, or other parameters (e.g., 208, 210, 212, and/or 214 in FIG. 2). For example, an executive organization within the customer site may have access to project management applications, while a sales organization within the customer site may have access to contact management applications. In another example, users within different organizations may have different mailbox sizes, or the like.

In other examples, the online configuration services may monitor how much time and users are spending with particular applications, and budget these times according to some pre-existing constraints. More generally, the online configuration services may enforce administrative policies, as may be defined at various levels in the layered architecture described herein. For example, a given customer may specify that its employees are to log into a given application immediately upon logging in to a given client system, may specify that the client systems belonging to that customer are have logging enabled at all times, or the like.

Continuing the above example, when one of the end-users 250 requests to access the client systems, the service clients running on these client systems may identify the organization to which the requesting end user belongs, and create local configurations (e.g., 504*b* or 504*m*) that configures the appropriate client system (e.g., 108*b* or 108*m*) appropriately for an end-user within that organization.

Having described the configuration scenarios shown in FIG. 5, the discussion now turns to a more detailed description of the configuration database. This description is now presented with FIG. 6.

Figure 6:
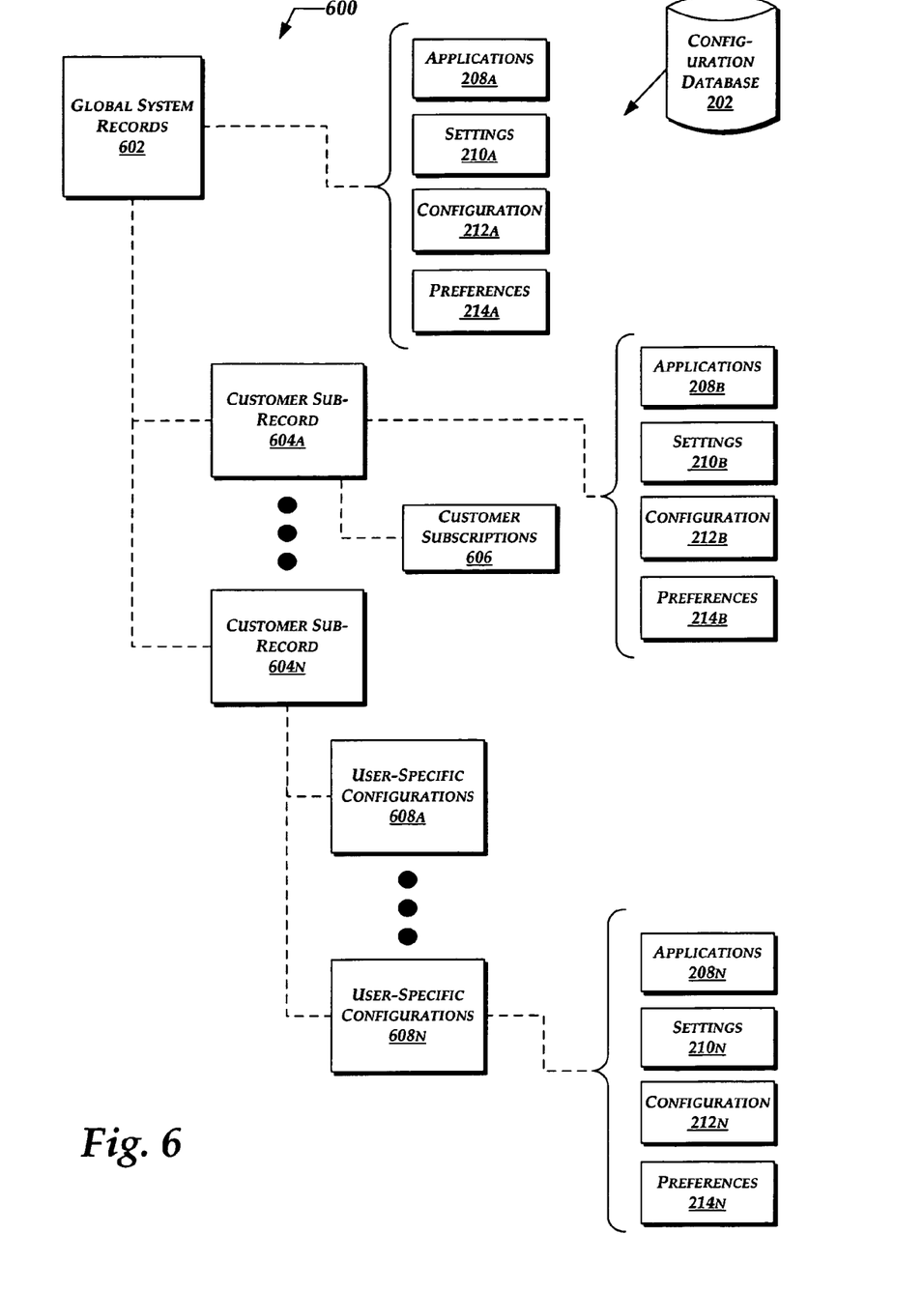
FIG. 6 is a database diagram illustrating fields and records that provide structures for databases that store configurations for a variety of subscribers to online services that remotely manage client systems.

FIG. 6 illustrates fields and records, denoted generally at 600, that provide structures for databases that store configurations for a variety of subscribers to online services that remotely manage client systems. For ease of reference, and not limitation, FIG. 6 may carry forward some reference numbers from previous drawings to refer to similar items. For example, FIG. 6 carries forward an example configuration database, denoted at 202.

Turning to the configuration database in more detail, the database may contain one or more global system records, as denoted at 602. The global system records may maintain listings of all client applications that an online configuration service (e.g., 402 in FIG. 4) may remotely manage and configure. FIG. 6 carries forward an example of these applications at 208*a*. In addition, the global system records may maintain listings of various settings (e.g., 210*a*), various configuration parameters (e.g., 212*a*), and/or various preferences (e.g. 214*a*), and which may apply to managed applications or client systems (e.g., 108). In operational scenarios, the server system 102 may maintain and manage the global system records 602.

The global system record 602 may be associated with one or more sub-records that contain subscription information for particular customer sites (e.g., 404 in FIG. 4). FIG. 6 illustrates two examples of such sub-records, denoted at 604*a* and 604*n* (collectively, client sub-records 604). However, implementations of this description may include any number of sub-records corresponding to any number of particular subscribing customer sites. In possible operational scenarios, the service clients (e.g., 142) installed on particular client systems may maintain and manage the client sub-records 604. FIG. 6 also illustrates examples of subscription records 606, which may store subscription information pertaining to particular subscribing client sites.

Turning to the client sub-record 604*a* for example, these client sub-records 604 may indicate which applications the customer site has installed and these configurations are managed by the online service. FIG. 6 denotes these applications at 208*b*. In addition, the client sub-record 604*a* may indicate any particular settings (e.g., 210*b*), any particular configuration parameters (e.g., 212*b*), and/or any particular references (e.g., 214*b*) that are specified across a particular customer site. In this manner, the fields 208*b*-214*b* associated with the client sub-record 604*a* may further filter or modify the fields 208*a*-214*a* associated with the global system record 602, thereby implementing the layered or filtered architecture described herein.

Turning to the client sub-record 604*n* as another example, the client sub-records 604 may he associated with one or more sub-records records 608 that indicate, within a given customer site, any configurations specified for particular organizations, users, and/or particular client systems within that site. FIG. 6 provides two examples of such records at 608*a* and 608*n* (collectively, sub-records 608). However, implementations of the database 202 may include a number of such sub-records 608. In possible operational scenarios, the client-side administration service (e.g., 134) and/or the service client (e.g., 142) may maintain and manage the summer-records 608.

Turning, for example, to the sub-record 608*n*, FIG. 6 illustrates examples of user-specific configurations, which may include particular applications to be exposed to a particular user (e.g., 208*n*), as well as any particular settings (e.g., 210n), configuration parameters (e.g., 212n), and/or preferences (e.g., 214n) related to these applications. Recalling the above example pertaining to different organizations within a customer site, for an end-user within an executive organization, the applications 208 may represent project management applications, or the like. As another example, for an end-user within a sales organization, the applications 208 may represent contact management tools, sales tools, or the like.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The drawings and description herein illustrate various process and/or data flows as proceeding in one or more directions. However, it is noted that any directional indications in the drawings are provided for convenience only, and do not limit possible implementations. More specifically, unidirectional arrows in the drawings to not preclude implementations that include bidirectional data or process flows. If The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method comprising performing computer-implemented operations for:
   subscribing to have an online configuration service remotely manage at least one application that is installed on at least one client system;
   updating at least one dynamically-updated list of applications made available through services based on the subscribing to have the online configuration service remotely manage the at least one application;
   sending at least one authentication request to the online configuration service;
   receiving at the at least one client system in response to the authentication request, the at least one dynamically-updated list of applications made available through services to which a customer site has subscribed to from the online configuration service, wherein the dynamically-updated list of applications made available through services indicates a representation of the at least one application;
   updating at least one dynamically-updated configuration payload based on resolving an incompatibility between different services or applications installed on the at least one client system;
   receiving at the at least one client system the at least one dynamically-updated configuration payload related to configuring the at least one application on the at least one client system with respect to a particular end-user;
   configuring the at least one application based on the dynamically-updated configuration payload; and
   presenting at least one user interface on the at least one client system, wherein the user interface includes a representation of the at least one configured application.

2. The method of claim 1, further comprising receiving user input selecting the configured application, and further comprising launching the selected application in response to the user input.

3. The method of claim 1, further comprising subscribing to have the online configuration service remotely manage at least a further application.

4. The method of claim 3, wherein receiving at least one dynamically-updated list of applications includes receiving a list that is updated to incorporate at least the further application.

5. The method of claim 3, further comprising receiving at least a further configuration payload related to configuring at least the further application on the at least one client system.

6. The method of claim 5, further comprising configuring at least the further application in response to receiving the further configuration payload.

7. The method of claim 3, wherein presenting at least one user interface includes presenting a user interface that includes a representation of at least the further application.

8. The method of claim 1, further comprising applying to the at least one application at least one setting or at least one preference defined locally at the at least one client system.

9. A computer-implemented method comprising performing computer-implemented operations for:
   receiving, by a computing device, subscription information from at least one customer site, wherein the subscription information indicates that the at least one customer site has subscribed to have an online configuration service remotely manage at least one application installed at the at least one customer site;
   updating, by the computing device, at least one dynamically-updated list of applications made available through services based on the indication of subscribing to have the online configuration service remotely manage the at least one application;
   sending at least one authentication request to the online configuration service;
   sending, by the computing device and in response to the authentication request, the dynamically-updated list of applications made available through services to the at least one customer site, wherein the dynamically-updated list of applications made available through services includes a list of services to which a customer site has subscribed to including a representation of the at least one application; and
   sending, by the computing device, a configuration payload to the at least one customer site, wherein the configuration payload specifies how to configure the at least one application with respect to a particular end-user.

10. The method of claim 9, further comprising receiving, by the computing device, at least one authentication request from at least one client system located at the at least one customer site.

11. The method of claim 10, further comprising identifying, by the computing device, the at least one application to be managed at the at least one customer site in response to the authentication request.

12. The method of claim 9, further comprising receiving, by the computing device, further subscription information from the at least one customer site, wherein the further subscription information indicates that the at least one customer site has subscribed to have the online configuration service remotely manage at least a further application installed at the at least one customer site.

13. The method of claim 12, further comprising sending, by the computing device, a further dynamically-updated list of applications that includes a representation of the further application, and further comprising sending a further configuration payload to the at least one customer site, wherein the further configuration payload specifies how to configure at least the further application.

14. The method of claim 9, further comprising updating, by the computing device, the configuration payload in response to at least one modification affecting the at least one application, and further comprising sending the updated configuration payload to the at least one customer site.

15. The method of claim 9, further comprising filtering, by the computing device, a list of applications available to be managed by the online configuration service to select the at least one application installed at the at least one customer site.

16. A system for providing online configuration services for remotely managing at least one client system, the system comprising:
   a first computing device configured to
      maintain data representing a plurality of applications that the online configuration services may remotely manage on at least one customer site,
      maintain data representing a plurality of configuration settings that correspond respectively to the plurality of applications and to
      send configuration information that includes at least data representing the applications and data representing the configuration settings;
   a second computing device configured to
      receive the configuration information from the first computing device,
      receive subscription information from at least one customer site, wherein the subscription information indicates that the at least one customer site has subscribed to have the online configuration services manage at least one application that is installed on at least one client system at the at least one customer site,
      filter the data representing the applications to select from the at least one application of the plurality of applications that is installed on the at least one client system at the at least one customer site,
      filter the data representing the configuration settings to select configuration settings that specify how to configure at least the one application on the at least one client system,
      update at least one dynamically-updated configuration payload based on resolving an incompatibility between different services or applications installed on the at least one client system, and to communicate the at least one dynamically-updated configuration payload, including the filtered application data and at least the filtered configuration settings; and
   the at least one client system configured to
      receive the at least one dynamically-updated configuration payload from the second computing device,
      configure the at least one application installed on the at least one client system with respect to a particular end-user, based on the dynamically-updated configuration payload, and to
      present at least one user interface on the at least one client system, wherein the at least one user interface includes a representation of the at least one configured application.

17. The system of claim 16, wherein the second computing device provides a server-side administration service for remotely managing at least the one application installed on the at least one client system.

18. The system of claim 16, wherein the second computing device provides a client-side administration service for remotely managing at least the one application installed on the at least one client system.

19. The system of claim 16, further comprising at least one configuration database for storing at least the data representing the applications that the online configuration services may remotely manage the at least one customer site, the data representing the plurality of configuration settings that correspond respectively to the plurality of applications, and the subscription data.

* * * * *